US011732384B2

(12) United States Patent
Williams et al.

(10) Patent No.: US 11,732,384 B2
(45) Date of Patent: Aug. 22, 2023

(54) POLYESTER FIBER BLENDS AND METHODS OF MANUFACTURING SAME (71) Applicant: Aladdin Manufacturing Corporation, Calhoun, GA (US)

(72) Inventors: James L. Williams, Marietta, GA (US); Mark G. Dye, Rome, GA (US); Jonathan Skelley, Ringgold, GA (US); Thomas R. Clark, Chattanooga, TN (US)

(73) Assignee: Aladdin Manufacturing Corporation, Calhoun, GA (US)

( * ) Notice: Subject to any disclaimer, the term of this patent is extended or adjusted under 35 U.S.C. 154(b) by 0 days.

(21) Appl. No.: 17/007,852

(22) Filed: Aug. 31, 2020

(65) Prior Publication Data

US 2020/0399786 A1    Dec. 24, 2020

Related U.S. Application Data (63) Continuation of application No. 15/469,025, filed on Mar. 24, 2017, now Pat. No. 10,767,281.

(60) Provisional application No. 62/313,356, filed on Mar. 25, 2016.

(51) Int. Cl.
*D01F 6/92* (2006.01)
*C08L 67/02* (2006.01)
*C08J 11/16* (2006.01)
*B29C 48/18* (2019.01)
*B29C 48/40* (2019.01)
*B29B 17/00* (2006.01)
*B29B 7/74* (2006.01)
*B29B 7/42* (2006.01)
*B29B 7/48* (2006.01)
*D02G 3/44* (2006.01)
*B29B 7/86* (2006.01)
*B29C 48/43* (2019.01)
*B29C 48/44* (2019.01)
*B29C 48/425* (2019.01)
*B29K 67/00* (2006.01)
*B29L 31/00* (2006.01)

(52) U.S. Cl.
CPC ............... *D01F 6/92* (2013.01); *B29B 7/426* (2013.01); *B29B 7/485* (2013.01); *B29B 7/487* (2013.01); *B29B 7/748* (2013.01); *B29B 7/7461* (2013.01); *B29B 7/7485* (2013.01); *B29B 7/86* (2013.01); *B29B 17/00* (2013.01); *B29B 17/0026* (2013.01); *B29C 48/185* (2019.02); *B29C 48/404* (2019.02); *B29C 48/425* (2019.02); *B29C 48/43* (2019.02); *B29C 48/44* (2019.02); *C08J 11/16* (2013.01); *C08L 67/02* (2013.01); *D02G 3/445* (2013.01); *B29K 2067/003* (2013.01); *B29L 2031/7322* (2013.01); *C08J 2367/02* (2013.01); *C08L 2203/12* (2013.01); *C08L 2205/025* (2013.01); *C08L 2205/03* (2013.01); *D10B 2331/04* (2013.01); *D10B 2503/04* (2013.01); *Y02W 30/62* (2015.05)

(58) Field of Classification Search
CPC ... D01F 6/92; D10B 2331/04; D10B 2503/04; C08L 67/02; C08L 2205/025; C08L 2205/03; C08L 2203/12
See application file for complete search history.

(56) References Cited

U.S. PATENT DOCUMENTS

| | | | |
|---|---|---|---|
| 4,408,446 A * | 10/1983 | Wilkie | D02G 1/205 112/410 |
| 4,475,330 A | 10/1984 | Kimura et al. | |
| 5,645,782 A | 7/1997 | Howell et al. | |
| 6,109,015 A | 8/2000 | Roark et al. | |
| 6,113,825 A | 9/2000 | Chuah | |
| 6,287,688 B1 | 9/2001 | Howell et al. | |
| 6,333,106 B2 | 12/2001 | Howell et al. | |
| 6,921,803 B2 | 7/2005 | Chang et al. | |
| 8,597,553 B1 | 12/2013 | Clark | |
| 2005/0047267 A1 | 3/2005 | Gneuss et al. | |
| 2006/0165949 A1* | 7/2006 | Segars | D06N 7/0081 428/85 |
| 2008/0157425 A1* | 7/2008 | Rodgers | D01F 6/92 264/176.1 |
| 2008/0311372 A1 | 12/2008 | Kulkarni | |
| 2013/0337249 A1* | 12/2013 | Fenyvesi | H01B 3/50 442/364 |

FOREIGN PATENT DOCUMENTS

WO    WO 0015886 A1 *  3/2000  ............... D01F 6/92

OTHER PUBLICATIONS

Majumdar, A., et al.; Process Control in Textile Manufacturing, 2013, p. 41-78.*
Altun, S. et al. *Improvement of Waste Recycling In PET Fiber Production*, Journal of Polymers and the Environment, Oct. 2004, vol. 12, No. 4, pp. 231-237.
Liang, Hao et al. *Miscibility and Melting Behavior of Poly(ethylene terephthalate)/Poly(trimethylene terephthalate) Blends*, Journal of Applied Polymer Science, (2008), vol. 107, (2008), pp. 431-437.

(Continued)

Primary Examiner — Robert S Jones, Jr.
(74) Attorney, Agent, or Firm — Alston & Bird LLP (57) ABSTRACT This application is directed to polymer blends of polyethylene naphthalate, polytrimethylene terephthalate, and polyethylene naphthalate, for use in fibers, such as carpet fibers, and other applications. This application is also directed to methods of producing such polymer blends and fibers.

9 Claims, 5 Drawing Sheets (56) References Cited

OTHER PUBLICATIONS

Supaphol, Pitt et al., *Thermal, Crystallization, Mechanical, and Rheological Characteristics of Poly(trimethylene terephthalate)/Poly(ethylene terephthalate) Blends*, Journal of Polymer Science: Part B: Polymer Physics, (2004), vol. 42, pp. 676-686.
Tharmapuram, Sriram R. et al. *Processing Characteristics of PET/PEN Blends, Part 2: Rheology and Degradation Kinetics*, Advances In Polymer Technology, (2003), vol. 22, No. 2, pp. 147-154.
U.S. Appl. No. 15/469,025, filed Mar. 24, 2017, U.S. Pat. No. 10,767,281, Issued.
U.S. Appl. No. 62/313,356, filed Mar. 25, 2016, Expired.

\* cited by examiner

POLYESTER FIBER BLENDS AND METHODS OF MANUFACTURING SAME

RELATED APPLICATIONS

This application is a continuation of U.S. application Ser. No. 15/469,025, filed Mar. 24, 2017, which claims the benefit of U.S. Provisional App. No. 62/313,356 filed Mar. 25, 2016, which are hereby incorporated by reference in their entirety.

FIELD

The invention relates to polymeric fiber blends, and particularly polyester fiber blends comprising polyethylene terephthalate (PET), polytrimethylene terephthalate (PTT), and polyethylene naphthalate (PEN), useful in carpet yarns and carpets. The invention further relates to methods of improving physical characteristics of PET carpet fibers through the addition of PTT and PEN in polymeric blends, and methods of preparing manufacturing bulked continuous carpet filaments comprising a PET/PTT/PEN blend.

BACKGROUND

Carpets, rugs, mats, and like floor coverings used in home and industrial applications are typically made from natural fibers (such as cotton and wool) or synthetic fibers (such as nylon, polyester, polyolefins, acrylics, rayon, and cellulose acetate). Synthetic fibers tend to be more favored in carpet manufacture, as they are generally more commercially acceptable and can be used for a wider variety of applications.

Polyethylene terephthalate (PET), a thermoplastic fiber polymer resin in the polyester family, is a commonly used synthetic fiber for carpet applications. One of the drawbacks of PET carpets is that they have lower dyeability (i.e. are less easily dyed) than other types of carpets, such as nylon.

Polytrimethylene terephthalate (PTT) is another polyester which may be used in carpeting. One way of improving the dyeability of PET is by blending it with PTT. However, adding PTT to PET in amounts high enough to create deep dyeing PET, reduces the strength of the fiber, meaning that the PET/PTT blend fiber will not be suitable for further processing.

Accordingly, a need exists for a PET/PTT blended carpet with improved strength qualities, and deep dyeability.

SUMMARY

The present invention provides fibers comprising polymeric blends of polyethylene terephthalate (PET), polytrimethylene terephthalate (PTT), and polyethylene naphthalate (PEN) providing improved strength and dyeability properties compared to either a PET/PTT or PET/PEN polymeric blend.

In an embodiment, the blend comprises about 1% to about 15% polytrimethylene terephthalate and about 1% to about 15% polyethylene naphthalate, wherein the balance is polyethylene terephthalate.

The invention also provides a carpet or a yarn comprising such fibers.

The invention also provides a method of using a multi-screw extruder to manufacture a bulked continuous carpet filament using a polymeric blend of PET, PTT, and PEN.

BRIEF DESCRIPTION OF THE SEVERAL VIEWS OF THE DRAWING(S)

Reference will now be made to the accompanying drawing, which is not necessarily drawn to scale, and wherein.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. In the following description, various components may be identified as having specific values or parameters, however, these items are provided as exemplary embodiments. Indeed, the exemplary embodiments do not limit the various aspects and concepts of the present invention as many comparable parameters, sizes, ranges, and/or values may be implemented. The terms "first," "second," and the like, "primary," "exemplary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item.

Each embodiment disclosed herein is contemplated as being applicable to each of the other disclosed embodiments. All combinations and sub-combinations of the various elements described herein are within the scope of the invention.

It is understood that where a parameter range is provided, all integers within that range, and tenths and hundredths thereof, are also provided by the invention. For example, "5-10%" includes 5%, 6%, 7%, 8%, 9%, and 10%; 5.0%, 5.1%, 5.2% . . . 9.8%, 9.9%, and 10.0%; and 5.00%, 5.01%, 5.02% . . . 9.98%, 9.99%, and 10.00%.

As used herein, "about" in the context of a numerical value or range means ±10% of the numerical value or range recited or claimed.

As used herein, "recycled" refers to any material that is post-consumer or post-industrial material.

As used herein, "post-consumer" means a component part, intermediate, or final product that contains in whole, or in significant part, a waste material produced by the end consumer of a material stream.

As used herein, "post-industrial" means a component part, intermediate, or final product that contains in whole, or in significant part, a waste material produced prior to the end consumer of a material stream and which may be reintroduced as manufacturing scrap back into the same or different manufacturing process.

As used herein, "deep dyeability" refers to a dye strength increase of three times.

Embodiments of the invention are directed to a polymeric blend comprising PET, PTT and PEN, and in particular to fibers and yarns comprising the polymeric blend. Typically, the amount of PTT in the polymeric blend is from about 1 to 15 weight percent, and in particular from about 5 to 15 weight percent, and more particularly from about 5 to 12 weight percent, and more particularly from about 8 to 12 weight percent, and more particularly from about 8 to 10 weight percent, based on the total weight of the blend. Similarly, the amount of PEN in the polymeric blend is from about 1 to 15 weight percent, and in particular from about 5 to 15 weight percent, and more particularly from about 5 to 12 weight percent, and more particularly from about 8 to 12 weight percent, and more particularly from about 8 to 10 weight percent, based on the total weight of the blend. Typically, PET comprises the remaining balance of the polymeric blend. For example, the amount of PET in the blend may range from about 68 to 98 weight percent, with an amount of PET being from about 75 to 85 weight percent, and from 78 to 84 weight percent, based on the total weight of the blend being somewhat more preferred.

In an embodiment, the fiber contains about 8% by weight PTT and about 10% by weight PEN.

In an embodiment, the fiber is as-spun. In another embodiment, the fiber is heat-set.

In embodiments, the fiber exhibits increased dyeability compared to a similar fiber where a portion, or all, of the polytrimethylene terephthalate is replaced by polyethylene terephthalate. In an embodiment, the fiber the fiber exhibits increased dyeability compared to a similar fiber where a portion, or all, of the polytrimethylene terephthalate is replaced by polyethylene terephthalate. In embodiments, the increase in dyeability is at least about 1% to at least about 300%.

In an embodiment, the increase in dyeability caused by the addition of polyethylene naphthalate and polytrimethylene terephthalate to polyethylene terephthalate is greater than the sum of the increase in dyeability caused by adding polyethylene naphthalate to polyethylene terephthalate and the increase in dyeability caused by adding polytrimethylene terephthalate to polyethylene terephthalate.

In an embodiment, the fiber exhibits an improvement in a physical characteristic selected from the group consisting of total recovery, elongation, crimp, tenacity, and shrinkage, compared to a similar fiber where a portion of the polyethylene naphthalate is replaced by a combination of polyethylene terephthalate. In a further embodiment, the improvement is at least 1% to at least 25%.

In an embodiment, at least one, preferably at least two, and more preferably all three of the polyethylene terephthalate polymer, the polytrimethylene terephthalate polymer, and the polyethylene naphthalate polymer are recycled.

The polymeric blends of the present invention may further comprise other components, such as, without limitation, finishing agents, delusterants, viscosity boosters, optical brighteners, matting agents (e.g., titanium oxide), thermal stabilizing agents (e.g., phosphorous compounds), anti-oxidative agents (e.g., hindered phenol), anti-static agents, pigments, ultra-violet blocking agents, and combinations thereof. See, for example, U.S. Pat. No. 6,921,803, which is incorporated herein by reference in its entirety.

A wide variety of different PET may be used as the PET component in the polymeric blend. For example, the PET polymer can comprise LASER+® PET (available from DAK Americas), NAN YA® PET (Nan Ya Plastics Corporation, America), other PET polymers, or combinations thereof. PET can be produced, for example, by a transesterification reaction of dimethyl terephthalate and ethylene glycol, or by esterification of terephthalic acid and ethylene glycol. PET may be provided from both virgin and recycled resins. In a preferred embodiment, the PET comprises recycled PET that is recovered from soda and water bottles. The PET may be in flake or pellet form in any of the embodiments described herein.

In an embodiment, the intrinsic viscosity (IV) of the PET used in the embodiments of the invention is at least about 0.60 dL/g. In a further embodiment, the IV is in a range from about 0.60 dL/g to about 1.00 dL/g. In a further embodiment, the IV is in a range from about 0.75 dL/g to about 1.00 dL/g.

The PTT component can comprise PTT belonging to one or more different types of PTT polymer. For example, the PTT polymer can comprise SORONA® PTT (available from E.I. Du Pont de Nemours), other PTT polymers, or combinations thereof. PTT is generally produced by the polycondensation reaction of purified terephthalic acid (PTA) and 1,3-propanediol (PDO). Some PTT is produced solely by chemical reaction of petroleum based ingredients, while SORONA® PTT is produced using PDO obtained by bacterial metabolism.

In an embodiment, the IV of the PTT used in the embodiments of the invention is in a range from about 0.8 dL/g to about 1.04 dL/g. In a further embodiment, the IV of the PTT is in a range from about 0.86 dL/g to about 0.98 dL/g. In a further embodiment, the IV of the PTT is about 0.92 dL/g.

The PEN component may comprise PEN belonging to one or more types of PEN polymer. For example, the PEN component may comprise PEN produced with precursors provided by BP-Amoco®, other PEN, or combinations thereof. PEN may be produced, for example, by the polycondensation reaction of naphthalene-2,6-dicarboxylic acid (2,6-NDA) or a functional derivative, with ethylene glycol. PEN may be provided from both virgin and recycled resins. In a preferred embodiment, the PEN component comprises a recycled resin. The PEN may be in flake, pellet, or condux form.

In an embodiment, the IV of the PEN used in the embodiments of the invention is in a range from about 0.4 dL/g to about 0.9 dL/g. In a further embodiment, the IV of the PEN is in a range from about 0.53 dL/g to about 0.78 dL/g.

The fibers may be manufactured as bulked continuous filament (BCF).

The invention also provides a method of manufacturing bulked continuous carpet filament, said method comprising:

(A) providing a multi-screw extruder that comprises:
    (i) a first satellite screw extruder, said first satellite screw extruder comprising a first satellite screw that is mounted to rotate about a central axis of said first satellite screw;
    (ii) a second satellite screw extruder, said second satellite screw extruder comprising a second satellite screw that is mounted to rotate about a central axis of said second satellite screw; and
    (iii) a pressure regulation system that is adapted to maintain a pressure within said first and second satellite screw extruders between about 0 millibars and about 1.8 millibars;

(B) using said pressure regulation system to reduce a pressure within said first and second satellite screw extruders to between about 0 millibars and about 1.8 millibars;

(C) while maintaining said pressure within said first and second satellite screw extruders between about 0 millibars and about 1.8 millibars, passing a melt comprising a polymer through said multi-screw extruder so that: (1) a first portion of said melt passes through said first satellite screw extruder, and (2) a second portion of said melt passes through said second satellite screw extruder; and (D) after said step of passing said melt of polymer through said multi-screw extruder, forming said polymer into a bulked continuous carpet filament;

wherein said bulked continuous carpet filament comprises a polymer blend comprising a polyethylene terephthalate polymer, a polytrimethylene terephthalate polymer, and a polyethylene naphthalate polymer.

In a further embodiment, said polymer is a polyethylene terephthalate polymer, and further comprising after step (C) and before step (D), cooling said melt of polymer so as to form pellets, and mixing said pellets with polytrimethylene terephthalate polymer pellets, and polyethylene naphthalate polymer pellets.

In a further embodiment, said extruder is a first extruder; and said method further comprises:

i) passing a plurality of flakes of PET through a second extruder; and ii) while passing said plurality of flakes through said second extruder, using said second extruder to heat said plurality of flakes to a temperature that is sufficient to at least substantially melt said plurality of polyester flakes to form said polymer melt.

In a further embodiment, wherein said PET flakes are recycled PET flakes, and wherein said method further comprises, before said step of passing said plurality of flakes through said second extruder:

washing said plurality of PET flakes;

scanning said washed plurality of PET flakes to identify any of said plurality of flakes that comprise material other than PET; and removing at least one of said identified flakes that comprise material other than PET.

In another embodiment, the melt in step (C) is a melt comprising polyethylene terephthalate, polyethylene naphthalate, and polytrimethylene terephthalate.

In a further embodiment, the PTT is not dried prior to step (C).

A further advantage of the invention is that the PET, PEN, and PTT can be recovered from previously prepared materials (e.g., recycled from soda bottles or other materials). Of course, the invention is not limited to the use of recycled PET, PEN, and PTT. Rather, virgin PET, PEN, and PTT (or a mixture of virgin and recycled PET, PEN, and PTT) could be used to spin the novel fiber. Moreover, the PET, PEN, and PTT used in the fibers of the invention can be substantially pure PET, PEN, and PTT or can each be copolymers comprising one or more comonomers. Unless otherwise noted, each of the PET, PEN, and PTT used in any of the embodiments of the invention may be virgin, recycled, or a blend thereof. In a preferred embodiment, the PTT is virgin polymer and the PEN and PET are recovered from previously prepared materials.

The fibers may be formed from the polymer blend by any method known in the art to produce fibers from a single polyester or from a blend. The polymeric blend can be extruded to have any shape or dimension suitable to polymeric carpet fibers. Moreover, the carpet fibers can undergo any post-spinning processes generally recognized as useful in the preparation of polymeric carpet fibers. By "fibers", reference is made to items, recognized in the art as fibers, such as continuous filaments, monofilaments, staple fibers, and the like. The fibers can be round or have other shapes, such as octalobal, delta, sunburst (also known as sol), scalloped oval, trilobal, tetra-channel (also known as quatra-channel), scalloped ribbon, ribbon, starburst, and the like. The fibers may also be solid, hollow, or multi-hollow. The fibers can be used to make yarns, and the fibers or yarns can be used to prepare a number of materials, particularly carpets, rugs, mats, and the like.

In one embodiment, the invention provides yarns prepared using the fibers described herein. The yarns may be prepared according to any method for preparing yarns recognized in the art as being useful therefore. For example, the yarn of the invention could be partially oriented yarn, spun drawn yarn, textured yarn, friction false-twisted yarn, and bulk continuous filament ("BCF") yarn. Partially oriented and friction false-twisted yarns of PTT are described in U.S. Pat. Nos. 6,287,688 and 6,333,106; BCF yarns are described in U.S. Pat. Nos. 5,645,782, 6,109,015, and 6,113,825, all of the above being incorporated herein by reference in their entireties. Preferred steps in preparing BCF yarn includes spinning (e.g., extruding, cooling, and coating filaments), single stage or multi-stage drawing (such as with heated rolls, heated pin or hot fluid assist) at a defined temperature and draw ratio, annealing, bulking, entangling, optionally relaxing, and winding the filaments on a package for subsequent use.

The invention also provides for a carpet comprising a fiber or a yarn as described hereinabove. One embodiment of carpet, a tufted carpet, includes fiber tufts, backing, filler material, and adhesive material. In some arrangements, the backing can include two components: the primary backing and the secondary backing.

Figure 1:
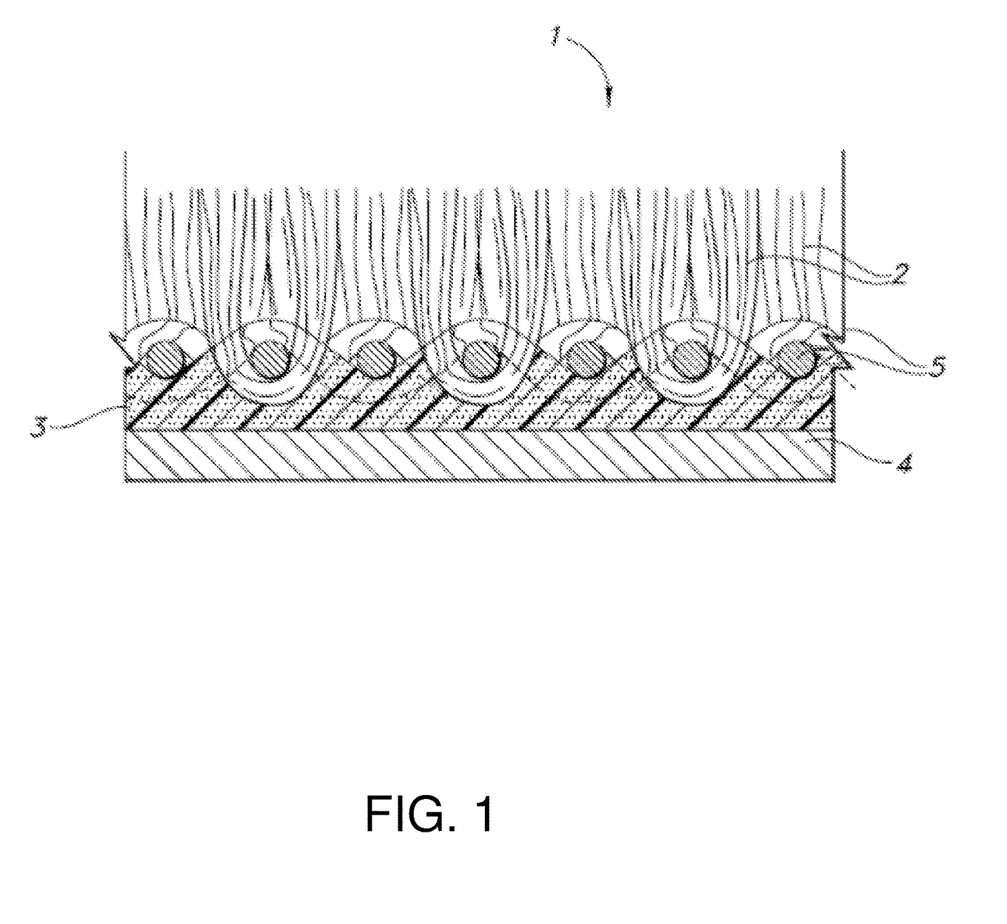
FIG. 1 is a cross-section diagram of a tufted carpet in accordance with an embodiment of the present invention.

One such construction of carpeting is illustrated schematically in FIG. 1, and is generally designated by reference numeral 1. The carpet 1 includes face yarn 2, which is tufted into a mesh, woven, or spunbonded fabric known as a primary backing 5. The primary backing 5 has pile yarns 2 tufted therethrough extending outwardly from one face, a primary backcoating or precoat 3 on the opposite face, and at least one secondary backcoating or main coat (frequently called a skip coat) 4. Other layers may also be associated with the carpet 1.

The primary backcoating or precoat 3 generally comprises carboxylated latex (e.g., a styrene-butadiene-based latex), PVC (polyvinylchloride), EVA (ethylene-vinyl acetate), or other polymer-based material, and the secondary backcoating 4 may also include polymers. One or both of the primary backcoatings 3 and secondary backcoating(s) 4 can include a filler material. The most common filler is a mineral filler, such as calcium carbonate, although other fillers, such as alumina trihydrate, bauxite, magnesium hydroxide, or the like, may be utilized. In certain situations, calcium carbonate can be used with other common materials such as metal salts. The carpet 1 may be produced with the filler in one or both of the primary backcoating 3 and secondary backcoating(s) 4 comprising waste carpeting as all or part of the filler.

The carpet 1 may also include any number of other layers, depending upon its intended use. For example, the carpet 1 may have a secondary backing, such as a woven or non-woven (e.g., spunbonded, melt blown, hydroentangled, or needle punched) fabric adapted to contact the floor or padding.

In making the carpet 1, generally, the fiber tufts are tufted through a woven or non-woven fabric, which is the primary backing 5. The part of the tufts on the exposed surface of the carpet comprises the face fiber or face yarn 2. A primary backcoating 3 is applied to the back of the tufted structure to lock in the tufts. Next, a woven or non-woven secondary backing 4 is attached to the back of the primary backing 5 to give the carpet added dimensional stability.

The primary backing is a supportive scrim through which the tufts are tufted, and is frequently is polyolefin, such as polyethylene or polypropylene; however, other materials such as polyester (including, for example, PET) can be used. For example, PET may be used. The secondary backing is a fabric that is adhered behind the primary backing, sandwiching therein the back of the tufts with the adhesive material. The secondary backing is frequently made of polypropylene; however other backing types, such as jute, PVC (polyvinyl chloride), polyurethane, and PET, can be used. The secondary backing may be a non-woven fabric, including, but not limited to, spun-bond, wet-laid, melt-blown, and air-entangled. A polyurethane foam or other cushioning material may be laminated or otherwise attached to the back side of the carpet.

A filler material, such as calcium carbonate, and an adhesive material are generally applied to the backside of the tufted carpet backing as a slurry in various concentrations. There is almost always more filler than adhesive material. For example, a representative filler-to-adhesive ratio can comprise about 80 percent by weight ("wt %" or "%") calcium carbonate to about 20 wt % adhesive. While calcium carbonate is one of the most commonly employed filler materials, it should be recognized by those skilled in the art to which this disclosure pertains that carpets containing other filler materials can be used in the recycling processes described herein.

The adhesive material functions to bind the tufts with the backing. The adhesive material can include a latex, such as a carboxylic-styrene-butadiene rubber, styrene-butadiene rubber (SBR), natural rubber latex, vinyl acetate ethylene copolymers (VAE or EVA), other natural or synthetic rubbers, urethanes or polymers such as PET. While latex is one of the most commonly employed adhesive materials for holding tufts to the carpet backing, it should be recognized by those skilled in the art to which this disclosure pertains that carpets containing other adhesives can be used in the processes described herein.

In an embodiment, the fiber is processed through a continuous dyeing operation or through a beck dyeing operation. The fiber may optionally be treated with a soil release agent and/or a soil repellency agent on the dyeline.

DISCUSSION AND EXAMPLES

As discussed hereinabove, the addition of PTT to PET fibers results in a fiber with greater dyeability. Accordingly, it would be desirable to add a large amount of PTT to the PET fibers in order to maximize dyeability. The downside is that adding PTT to the PET reduces the tensile strength of the blend, compared to the pure PET fiber. Adding PEN to the blend improves fiber tensile strength without sacrificing the improvements in dyeability gained from the addition of PTT. In some embodiments, adding PEN improves both the dyeability and the tensile strength.

As mentioned hereinabove, one method for producing fibers of the current invention is via a Multiple Rotating Screw (MRS) extruder, as described in U.S. Pat. No. 8,597,553, which is hereby incorporated by reference in its entirety. This process produces bulked continuous filament (BCF).

A BCF (bulked continuous filament) manufacturing process, according to the particular embodiment, may generally be broken down into four steps: (1) preparing flakes of PET polymer from post-consumer bottles for use in the process; (2) passing the flakes through an extruder that melts the flakes and purifies the resulting PET polymer; (3) combining the purified PET polymer with PTT and PEN polymer; and (4) feeding the combined polymer into a spinning machine that turns the polymer into filament for use in manufacturing carpets. These steps are described in greater detail below.

Step 1: Preparing Flakes of PET Polymer From Post-Consumer Bottles

In a particular embodiment, the step of preparing flakes of PET polymer from post-consumer bottles comprises: (A) sorting post-consumer PET bottles and grinding the bottles into flakes; (B) washing the flakes; and (C) identifying and removing any impurities or impure flakes.

A. Sorting Post-Consumer PET Bottles and Grinding the Bottles into Flakes

In particular embodiments, bales of clear and mixed colored recycled post-consumer (e.g., "curbside") PET bottles (or other containers) obtained from various recycling facilities make-up the post-consumer PET containers for use in the process. In other embodiments, the source of the post-consumer PET containers may be returned 'deposit' bottles (e.g., PET bottles whose price includes a deposit that is returned to a customer when the customer returns the bottle after consuming the bottle's contents). The curbside or returned "post-consumer" or "recycled" containers may contain a small level of non-PET contaminates. The contaminants in the containers may include, for example, non-PET polymeric contaminants (e.g., PVC, PLA, PP, PE, PS, PA, etc.), metal (e.g., ferrous and non-ferrous metal), paper, cardboard, sand, glass or other unwanted materials that may find their way into the collection of recycled PET. The non-PET contaminants may be removed from the desired PET components, for example, through one or more of the various processes described below.

In particular embodiments, smaller components and debris (e.g., components and debris greater than 2 inches in size) are removed from the whole bottles via a rotating trammel. Various metal removal magnets and eddy current systems may be incorporated into the process to remove any metal contaminants. Near Infra-Red optical sorting equipment such as the NRT Multi Sort IR machine from Bulk Handling Systems Company of Eugene, Oreg., or the Spyder IR machine from National Recovery Technologies of Nashville, Tenn., may be utilized to remove any loose polymeric contaminants that may be mixed in with the PET flakes (e.g., PVC, PLA, PP, PE, PS, and PA). Additionally, automated X-ray sorting equipment such as a VINYLCYCLE machine from National Recovery Technologies of Nashville, Tenn. may be utilized to remove remaining PVC contaminants.

In particular embodiments, a binary segregation of the clear materials from the colored materials is achieved using automated color sorting equipment equipped with a camera detection system (e.g., an Multisort ES machine from National Recovery Technologies of Nashville, Tenn.). In various embodiments, manual sorters are stationed at various points on the line to remove contaminants not removed by the sorter and any colored bottles. In particular embodiments, the sorted material is taken through a granulation step (e.g., using a 50B Granulator machine from Cumberland Engineering Corporation of New Berlin, Wis.) to size reduce (e.g., grind) the bottles down to a size of less than one half of an inch. In various embodiments, the bottle labels are removed from the resultant "dirty flake" (e.g., the PET flakes formed during the granulation step) via an air separation system prior to entering the wash process.

B. Washing the Flakes

In particular embodiments, the "dirty flake" is then mixed into a series of wash tanks. As part of the wash process, in various embodiments, an aqueous density separation is utilized to separate the olefin bottle caps (which may, for example, be present in the "dirty flake" as remnants from recycled PET bottles) from the higher specific gravity PET flakes. In particular embodiments, the flakes are washed in a heated caustic bath to about 190 degrees Fahrenheit. In particular embodiments, the caustic bath is maintained at a concentration of between about 0.6% and about 1.2% sodium hydroxide. In various embodiments, soap surfactants as well as defoaming agents are added to the caustic bath, for example, to further increase the separation and cleaning of the flakes. A double rinse system then washes the caustic from the flakes.

In various embodiments, the flake is centrifugally dewatered and then dried with hot air to at least substantially remove any surface moisture. The resultant "clean flake" is then processed through an electrostatic separation system (e.g., an electrostatic separator from Carpco, Inc. of Jacksonville, Fla.) and a flake metal detection system (e.g., an MSS Metal Sorting System) to further remove any metal contaminants that remain in the flake. In particular embodiments, an air separation step removes any remaining label from the clean flake. In various embodiments, the flake is then taken through a flake color sorting step (e.g., using an OPTYX sorting machine from Key Technology of Walla Walla, Wash.) to remove any remaining color contaminants remaining in the flake. In various embodiments, an electro-optical flake sorter based at least in part on Raman technology (e.g., a Powersort 200 from Unisensor Sensorsysteme GmbH of Karlsruhe, Germany) performs the final polymer separation to remove any non-PET polymers remaining in the flake. This step may also further remove any remaining metal contaminants and color contaminants.

In various embodiments, the combination of these steps delivers substantially clean (e.g., clean) PET bottle flake comprising less than about 50 parts per million PVC (e.g., 25 ppm PVC) and less than about 15 parts per million metals for use in the downstream extrusion process described below.

C. Identifying and Removing Impurities and Impure Flakes

In particular embodiments, after the flakes are washed, they are fed down a conveyor and scanned with a high-speed laser system. In various embodiments, particular lasers that make up the high-speed laser system are configured to detect the presence of particular contaminates (e.g., PVC or Aluminum). Flakes that are identified as not consisting essentially of PET may be blown from the main stream of flakes with air jets. In various embodiments, the resulting level of non-PET flakes is less than 25 ppm.

In various embodiments, the system is adapted to ensure that the PET polymer being processed into filament is substantially free of water (e.g., entirely free of water). In a particular embodiment, the flakes are placed into a pre-conditioner for between about 20 and about 40 minutes (e.g., about 30 minutes) during which the pre-conditioner blows the surface water off of the flakes. In particular embodiments, interstitial water remains within the flakes. In various embodiments, these "wet" flakes (e.g., flakes comprising interstitial water) may then be fed into an extruder (e.g., as described in Step 2 below), which includes a vacuum setup designed to remove—among other things—the interstitial water that remains present in the flakes following the quick-drying process described above. In various embodiments, no step is taken to remove surface water from the flakes. In various embodiments, no step is taken to remove interstitial water from the flakes.

Step 2: Using an Extrusion System to Melt and Purify PET Flakes

Figure 2:
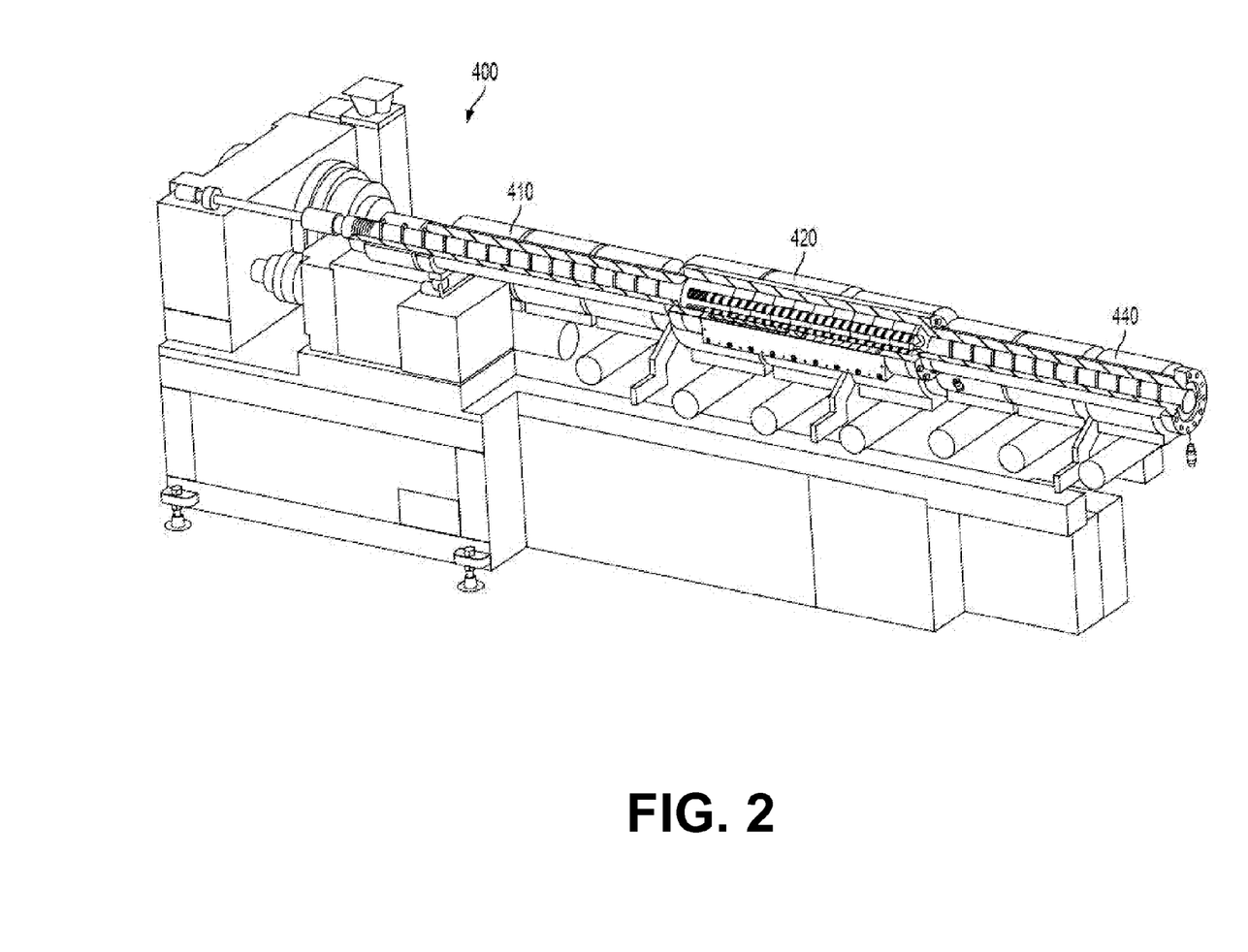
FIG. 2 is a perspective view of an MRS extruder that is suitable for use in a process for manufacturing bulked continuous filament.
Figure 3:
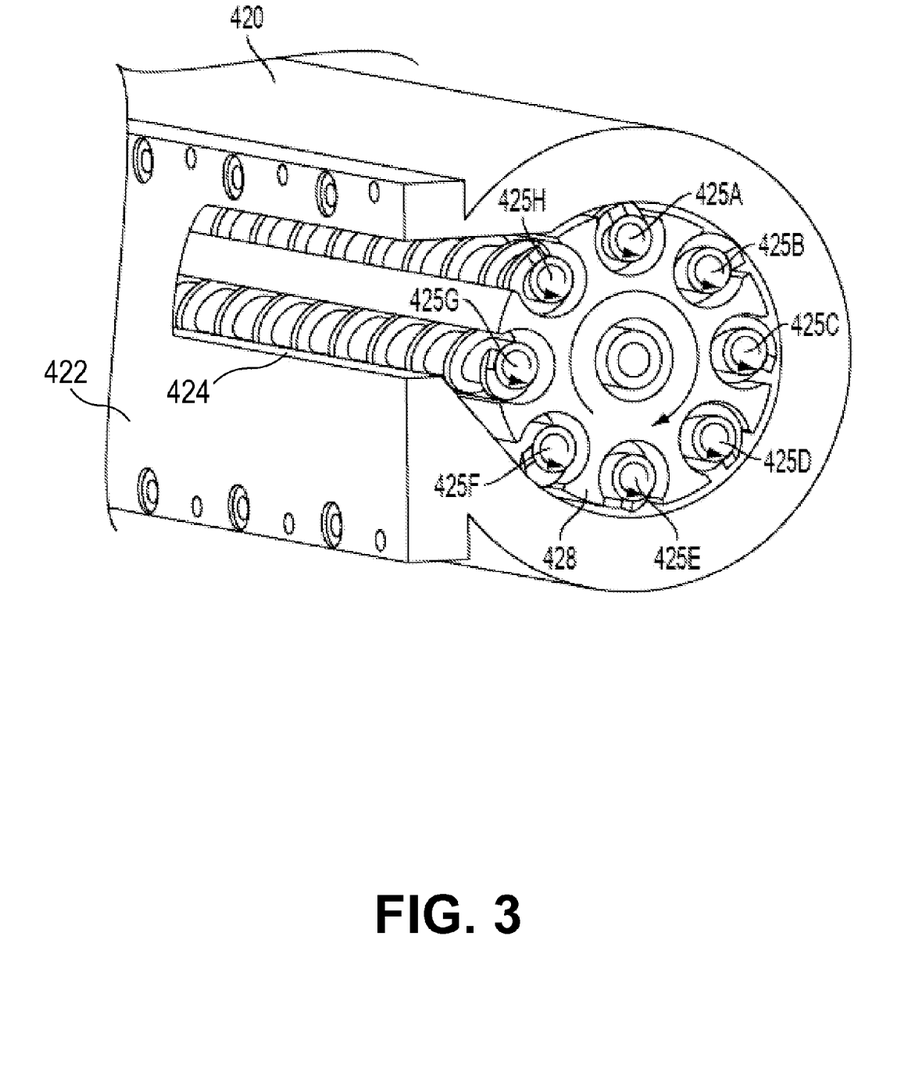
FIG. 3 is a cross-sectional view of an exemplary MRS section of the MRS extruder of FIG. 2.

In particular embodiments, an extruder is used to turn the wet flakes described above into a molten recycled PET polymer and to perform a number of purification processes to prepare the polymer to be turned into BCF for carpet. As noted above, in various embodiments, after Step 1 is complete, the recycled PET polymer flakes are wet (e.g., surface water is substantially removed (e.g., fully removed) from the flakes, but interstitial water remains in the flakes). In particular embodiments, these wet flakes are fed into a Multiple Rotating Screw ("MRS") extruder 400. In other embodiments, the wet flakes are fed into any other suitable extruder (e.g., a twin screw extruder, a multiple screw extruder, a planetary extruder, or any other suitable extrusion system). An exemplary MRS Extruder 400 is shown in FIGS. 2 and 3. A particular example of such an MRS extruder is described in U.S. Published Patent Application 2005/0047267, entitled "Extruder for Producing Molten Plastic Materials", which was published on Mar. 3, 2005, and which is hereby incorporated herein by reference.

As may be understood from this figure, in particular embodiments, the MRS extruder includes a first single-screw extruder section 410 for feeding material into an MRS section 420 and a second single-screw extruder section 440 for transporting material away from the MRS section.

In various embodiments, the wet flakes are fed directly into the MRS extruder 400 substantially immediately (e.g., immediately) following the washing step described above (e.g., without drying the flakes or allowing the flakes to dry). In particular embodiments, a system that feeds the wet flakes directly into the MRS Extruder 400 substantially immediately (e.g., immediately) following the washing step described above may consume about 20% less energy than a system that substantially fully pre-dries the flakes before extrusion (e.g., a system that pre-dries the flakes by passing hot air over the wet flakes for a prolonged period of time). In various embodiments, a system that feeds the wet flakes directly into the MRS Extruder 400 substantially immediately (e.g., immediately) following the washing step described above avoids the need to wait a period of time (e.g., up to eight hours) generally required to fully dry the flakes remove all of the surface and interstitial water from the flakes).

The prior art teaches that the PTT must be dried prior to extrusion and manufacturing the fibers. It was unexpectedly found that the manufacturing process ran more efficiently when the PTT was not dried prior to the extrusion process.

Figure 4:
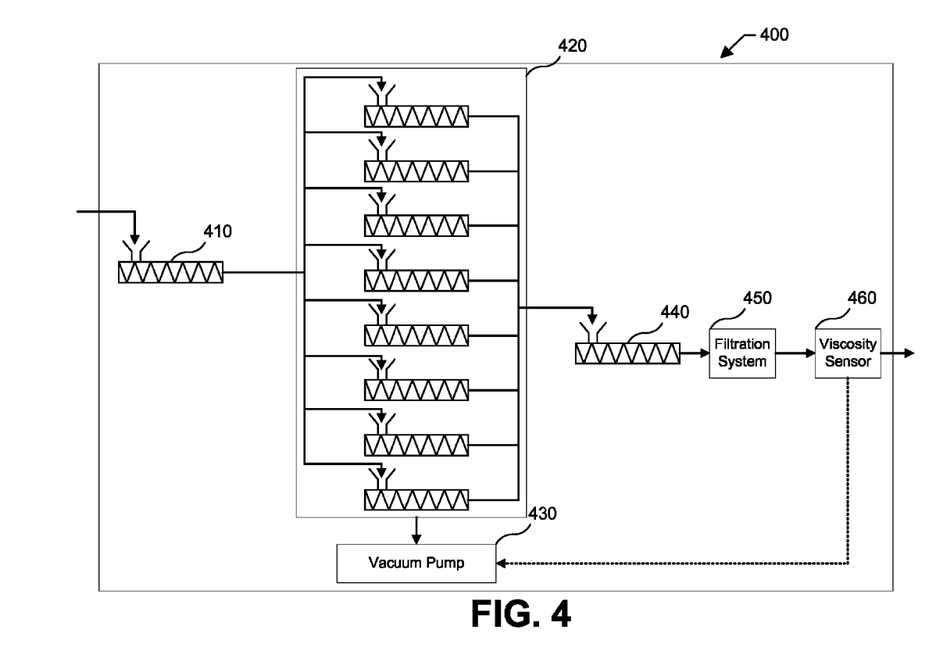
FIG. 4 depicts a process flow depicting the flow of polymer through an MRS extruder and filtration system according to a particular embodiment.

FIG. 4 depicts a process flow that illustrates the various processes performed by the MRS Extruder 400 in a particular embodiment. In the embodiment shown in this figure, the wet flakes are first fed through the MRS extruder's first single-screw extruder section 410, which may, for example, generate sufficient heat (e.g., via shearing) to at least substantially melt (e.g., melt) the wet flakes.

The resultant polymer melt (e.g., comprising the melted flakes), in various embodiments, is then fed into the extruder's MRS section 420, in which the extruder separates the melt flow into a plurality of different streams (e.g., 4, 6, 8, or more streams) through a plurality of open chambers. FIG. 3 shows a detailed cutaway view of an MRS Section 420 according to a particular embodiment. In particular embodiments, such as the embodiment shown in this figure, the MRS Section 420 separates the melt flow into eight different streams, which are subsequently fed through eight satellite screws 425A-H. As may be understood from FIG. 2, in particular embodiments, these satellite screws are substantially parallel (e.g., parallel) to one other and to a primary screw axis of the MRS Machine 400.

In the MRS section 420, in various embodiments, the satellite screws 425A-H may, for example, rotate faster than (e.g., about four times faster than) in previous systems. As shown in FIG. 3, in particular embodiments: (1) the satellite screws 425A-H are arranged within a single screw drum 428 that is mounted to rotate about its central axis; and (2) the satellite screws 425A-H are configured to rotate in a direction that is opposite to the direction in which the single screw drum rotates 428. In various other embodiments, the satellite screws 425A-H and the single screw drum 428 rotate in the same direction. In particular embodiments, the rotation of the satellite screws 425A-H is driven by a ring gear. Also, in various embodiments, the single screw drum 428 rotates about four times faster than each individual satellite screw 425A-H. In certain embodiments, the satellite screws 425A-H rotate at substantially similar (e.g., the same) speeds.

In various embodiments, as may be understood from FIG. 4, the satellite screws 425A-H are housed within respective extruder barrels, which may, for example be about 30% open to the outer chamber of the MRS section 420. In particular embodiments, the rotation of the satellite screws 425A-H and single screw drum 428 increases the surface exchange of the polymer melt (e.g., exposes more surface area of the melted polymer to the open chamber than in previous systems). In various embodiments, the MRS section 420 creates a melt surface area that is, for example, between about twenty and about thirty times greater than the melt surface area created by a co-rotating, twin screw extruder. In a particular embodiment, the MRS section 420 creates a melt surface area that is, for example, about twenty five times greater than the melt surface area created by a co-rotating twin screw extruder In various embodiments, the MRS extruder's MRS Section 420 is fitted with a Vacuum Pump 430 that is attached to a vacuum attachment portion 422 of the MRS section 420 so that the Vacuum Pump 430 is in communication with the interior of the MRS section via a suitable opening 424 in the MRS section's housing. In still other embodiments, the MRS Section 420 is fitted with a series of Vacuum Pumps. In particular embodiments, the Vacuum Pump 430 is configured to reduce the pressure within the interior of the MRS Section 420 to a pressure that is between about 0.5 millibars and about 5 millibars. In particular embodiments, the Vacuum Pump 430 is configured to reduce the pressure in the MRS Section 420 to less than about 1.5 millibars (e.g., about 1 millibar or less). The low-pressure vacuum created by the Vacuum Pump 430 in the MRS Section 420 may remove, for example: (1) volatile organics present in the melted polymer as the melted polymer passes through the MRS Section 420; and/or (2) at least a portion of any interstitial water that was present in the wet flakes when the wet flakes entered the MRS Extruder 400. In various embodiments, the low-pressure vacuum removes substantially all (e.g., all) of the water and contaminants from the polymer stream.

In a particular example, the Vacuum Pump 430 comprises three mechanical lobe vacuum pumps (e.g, arranged in series) to reduce the pressure in the chamber to a suitable level (e.g., to a pressure of about 1.0 millibar). In other embodiments, rather than the three mechanical lobe vacuum pump arrangement discussed above, the Vacuum Pump 430 includes a jet vacuum pump fit to the MRS extruder. In various embodiments, the jet vacuum pump is configured to achieve about 1 millibar of pressure in the interior of the MRS section 420 and about the same results described above regarding a resulting intrinsic viscosity of the polymer melt. In various embodiments, using a jet vacuum pump can be advantageous because jet vacuum pumps are steam powered and therefore substantially self-cleaning (e.g., self-cleaning), thereby reducing the maintenance required in comparison to mechanical lobe pumps (which may, for example, require repeated cleaning due to volatiles coming off and condensing on the lobes of the pump). In a particular embodiment, the Vacuum Pump 430 is a jet vacuum pump is made by Arpuma GmbH of Bergheim, Germany.

In particular embodiments, after the molten polymer is run the through the multi-stream MRS Section 420, the streams of molten polymer are recombined and flow into the MRS extruder's second single screw section 440. In various embodiments, the single stream of molten polymer is next run through a filtration system 450 that includes at least one filter. In a particular embodiment, the filtration system 450 includes two levels of filtration (e.g., a 40 micron screen filter followed by a 25 micron screen filter). Although, in various embodiments, water and volatile organic impurities are removed during the vacuum process as discussed above, particulate contaminates such as, for example, aluminum particles, sand, dirt, and other contaminants may remain in the polymer melt, Thus, this filtration step may be advantageous in removing particulate contaminates (e.g., particulate contaminates that were not removed in the MRS Section 420).

In particular embodiments, a viscosity sensor 460 (see FIG. 4) is used to sense the melt viscosity of the molten polymer stream following its passage through the filtration system 450. In various embodiments, the viscosity sensor 460, measures the melt viscosity of the stream, for example, by measuring the stream's pressure drop across a known area. In particular embodiments, in response to measuring an intrinsic viscosity of the stream that is below a predetermined level (e.g., below about 0.8 g/dL), the system may: (1) discard the portion of the stream with low intrinsic viscosity; and/or (2) lower the pressure in the MRS Section 420 in order to achieve a higher intrinsic viscosity in the polymer melt. In particular embodiments, decreasing the pressure in the MRS Section 420 is executed in a substantially automated manner (e.g., automatically) using the viscosity sensor in a computer-controlled feedback control loop with the vacuum section 430.

In particular embodiments, removing the water and contaminates from the polymer improves the intrinsic viscosity of the recycled PET polymer by allowing polymer chains in the polymer to reconnect and extend the chain length. In particular embodiments, following its passage through the MRS Section 420 with its attached Vacuum Pump 430, the recycled polymer melt has an intrinsic viscosity of at least about 0.60 dL/g (e.g., of between about 0.60 dL/g and about 1.00 dL/g, or between about 0.75 dL/g and about 1.00 dL/g). In particular embodiments, passage through the low pressure MRS Section 420 purifies the recycled polymer melt (e.g., by removing the contaminants and interstitial water) and makes the recycled polymer substantially structurally similar to (e.g., structurally the same as) pure virgin PET polymer. In particular embodiments, the water removed by the vacuum includes both water from the wash water used to clean the recycled PET bottles as described above as well as from unreacted water generated by the melting of the PET polymer in the single screw heater 410 (e.g., interstitial water). In particular embodiments, the majority of water present in the polymer is wash water, but some percentage may be unreacted water.

Step 3: Mixing Polymer Fed into Spinning Machine to be Turned into Carpet Yarn

In particular embodiments, after the recycled PET polymer has been extruded and purified by the above-described extrusion process, the molten polymer is cooled into pellets and mixed with PTT and PEN. This mixture is then melted and fed into a BCF (or "spinning") machine 500 that is configured to turn the molten polymer into bulked continuous filament.

Step 4: Mixed Polymer Fed into Spinning Machine to be Turned into Carpet Yarn

In particular embodiments, the spinning machine 500 extrudes molten polymer through small holes in a spinneret in order to produce carpet yarn filament from the polymer. In particular embodiments, the molten polymer blend cools after leaving the spinneret. The carpet yarn is then taken up by rollers and ultimately turned into filaments that are used to produce carpet. In various embodiments, the carpet yarn produced by the spinning machine 500 may have a tenacity between about 2 gram-force per unit denier (gf/den) and about 9 gf/den. In particular embodiments, the resulting carpet yarn has a tenacity of at least about 2 gf/den.

In particular embodiments, the spinning machine 500 used in the process described above is the Sytec One spinning machine manufactured by Oerlika Neumag of Neumuenster, Germany. The Sytec One machine may be especially adapted for hard-to-run fibers, such as nylon or solution-dyed fibers, where the filaments are prone to breakage during processing. In various embodiments, the Sytec One machine keeps the runs downstream of the spinneret as straight as possible, uses only one threadline, and is designed to be quick to rethread when there are filament breaks.

Although the example described above describes using the Sytec One spinning machine to produce pure carpet yarn filament from the polymer, it should be understood that any other suitable spinning machine may be used. Such spinning machines may include, for example, any suitable one-threadline or three-threadline spinning machine made by Oerlika Neumag of Neumuenster, Germany or any other company.

In various embodiments, the improved strength of the recycled PET polymer generated using the process above allows the polymer blend to be run at higher speeds through the spinning machine 500 than would be possible using pure virgin PET polymer. This may allow for higher processing speeds than are possible when using virgin PET polymer.

Alternate Embodiments

Non-MRS Extrusion System

In particular embodiments, the process may utilize a polymer flow extrusion system other than the MRS extruder described above. The alternative extrusion system may include for example, a twin screw extruder, a multiple screw extruder, a planetary extruder, or any other suitable extrusion system. In a particular embodiment, the process may include a plurality of any combination of any suitable conical screw extruders (e.g., four twin screw extruders, three multiple screw extruders, etc.).

Variations on Mixing Polymers

The above-described method describes an indirect method of preparing the PET/PTT/PEN blend, in which PET flakes are converted into PET pellets, the PET pellets are mixed with PEN pellets and PTT pellets, and the mix of pellets if fed into a subsequent extruder. Alternate embodiments of mixing the polymers include:

1. PET flakes, PEN pellets, and PTT pellets are mixed and fed into the MRS extruder.

2. PET flakes, PEN pellets, and PTT pellets are compounded into a single pellet, which is fed into a subsequent extruder, in this embodiment, the MRS system offers the advantage of minimizing IV loss during the production of the compounded pellets.

In some alternate embodiments, there is no step of cooling the PET into pellets and subsequently combining them with the PTT and PEN. In this alternate embodiment, the melted terpolymer can be fed directly into a suitable spinning machine to be turned into fiber.

Non-Recycled PET

The above-described embodiment describes the use of recycled PET (rPET) in preparing the terpolymer fiber. In an alternate embodiment, the fiber is prepared using virgin PET. In such an embodiment, some or all of the sub-parts of Step 1 are not performed.

Example 1—PET and PET Blends Dyeability

A number of PET and PET blend fibers were tested for dyeability. The fibers were produced via a Multiple Rotating Screw (MRS) extruder, via the direct method in which the polymers were combined in dry form prior to melting and purification in the MRS extruder, as described hereinabove. The components of the different tested fibers are summarized below in Table 1.

TABLE 1

Summary of Fiber Compositions

| Fiber | Components (remainder is PET) | Notes |
| --- | --- | --- |
| 1 | | Light yarn in a barber pole |
| 2 | | Dark yarn in a barber pole |
| 3 | 10% PTT | |
| 4 | 10% PTT, 1% PEG | |
| 5 | 14% PTT | |
| 6 | 20% PTT | SideStream |
| 7 | | 122 filaments (versus 150 filaments in Fiber 1) |
| A | 10% PEN | |
| B | 15% PEN | |
| C | 10% PEN, 6.5% PTT | |
| D | 15% PEN, 6.5% PTT | |
| E | 10% PEN, 10% PTT | |
| F | 15% PEN, 10% PTT | |

Fibers 1-7 were PET or PET/PTT blends. Fibers A-F were PET/PEN or PET/PEN/PTT blends.

Figure 5:
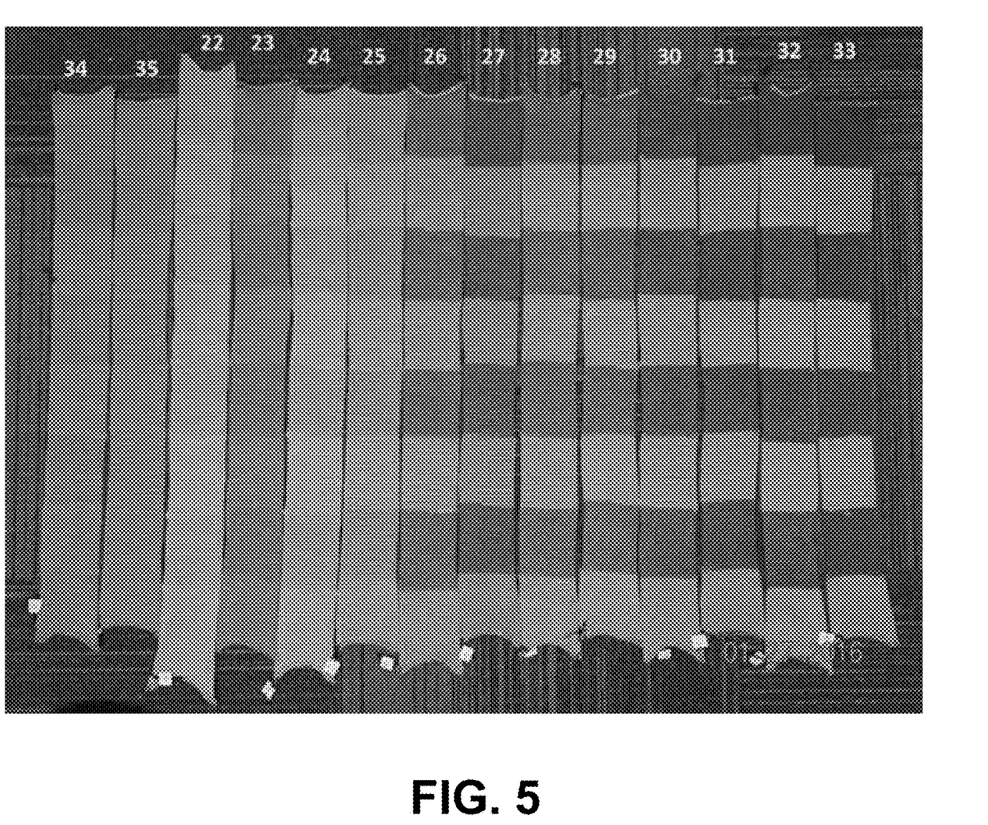
FIG. 5 depicts the dyed sleeves used to test dyeability in Example 1. The numbers represent the sleeve numbers, and the heads of the sleeves (i.e. the portion containing Fiber 1) are at the bottom of the Figure.

These fibers were knitted into sleeves. Each sleeve comprised alternating portions of Fiber 1 and each of the other fibers. FIG. 5 shows the sleeves for each of fibers A-F and 7, post-dyeing. Fibers 2-6 were tested, but are not represented in FIG. 5. The bottom-most portion of each sleeve is Fiber 1. Table 2 shows which sleeves correspond to which fiber. Each fiber corresponds to two sleeves, one of which was dyed as-spun, and the other of which was dyed post heat-setting.

TABLE 2

Sleeves of Fibers A-F and 7

| Fiber | Sleeves |
|---|---|
| A | 22 (as-spun), 23 (heat-set) |
| B | 24 (as-spun), 25 (heat-set) |
| C | 26 (as-spun), 27 (heat-set) |
| D | 28 (as-spun), 29 (heat-set) |
| E | 30 (as-spun), 31 (heat-set) |
| F | 32 (as-spun), 33 (heat-set) |
| 7 | 34 (as-spun), 35 (heat-set) |

Each sleeve was dyed in a laundrometer. Color measurements were recorded by spectrophotometer. The color strength of each fiber relative to the color strength of Fiber 1 in its own sleeve (Str %) was recorded. Table 3 summarizes the Str % for each of the different fibers, as-spun (Str % As-sp) and following heat setting (Str % HS). A higher Str % indicates greater dyeability.

TABLE 3

Average dyeability for each fiber blend

| Fiber | Str % As-sp | Str % HS |
|---|---|---|
| 1 | 100 | 100 |
| 2 | 263 | 430 |
| 3 | 174 | 187 |
| 4 | 224 | 267 |
| 5 | 224 | 307 |
| 6 | 217 | 270 |
| 7 | 89 | 95 |
| A | 114 | 124 |
| B | 125 | 129 |
| C | 228 | 260 |
| D | 236 | 253 |
| E | 308 | 347 |
| F | 358 | 384 |

Example 2: Physical Property Testing

Some of the fibers were also tested for their total recovery (% TR), crimp (% CO), shrinkage (% FS), elongation (%), and tenacity (g/denier). Tensile properties were tested on a Textechno Statimat ME+ tensile tester. Bulk, crimp, shrinkage, and recovery were tested on a Lawson-Hemphill TYT machine. Those results are summarized in Table 4.

TABLE 4

Physical property data for certain fiber blends

| Fiber | % TR | % CO | % FS | Elongation (%) | Tenacity (g/denier) |
|---|---|---|---|---|---|
| 1 | 15.0 | 11 | 4.5 | 33 | 3.1 |
| 3 | 14.42 | 9.91 | 5 | 40.2 | 2.6 |
| 4 | 14.45 | 9.69 | 5.28 | 39.5 | 2.49 |
| 5 | 14.45 | 8.98 | 6.01 | 41.4 | 2.35 |
| A | 15.63 | 11.3 | 4.88 | 31.15 | 2.98 |
| B | 15.63 | 10.62 | 5.59 | 31.94 | 2.6 |
| C | 14.47 | 10.45 | 4.49 | 35.12 | 2.55 |
| D | 14.3 | 9.86 | 4.91 | 37.03 | 2.39 |
| E | 13.71 | 9.73 | 4.41 | 39.93 | 2.42 |
| F | 14.25 | 8.83 | 5.94 | 37.15 | 2.05 |

The combined data show the benefits of the presence of PEN in PET/PTT blends. The presence of PEN, unexpectedly, causes the effect on dyeability of additional PTT to be increased.

To demonstrate, the Str % of as-spun Fiber 1 (0% PTT) is 100%. Adding 10% PTT (as in Fiber 3) gives a Str % of 174% (a 74% relative increase). Adding another 10% PTT (to have 20% PTT, as in Fiber 6) gives a Str % of 224% (only a relative increase of 29% compared to Fiber 3).

The difference in dyeability that 10% of PTT makes is much greater in PET blends when PEN is present. Comparing as-spun Fiber A (10% PEN) to as-spun Fiber E (10% PEN and 10% PTT), an increase in Str % from 114% to 308% is seen (a relative increase of 170%). A similar result is seen when comparing as-spun Fiber B (15% PEN) to as-spun Fiber F (15% PEN and 10% PTT), as an increase from 125 to 328 Str % occurs (a relative increase of 162%).

PET/PTT/PEN blends also demonstrate a favorable tradeoff between the increase in dyeability and the decreased strength caused by the addition of PTT. This can be seen when comparing the dyeability and physical property data of, among other pairings, Fibers C and E. Their compositions, physical property and dyeability data are reproduced in Table 5:

TABLE 5

Physical property and dyeability data for Fibers C and E

| Fiber | PEN | PTT | % TR | % CO | % FS | Elongation (%) | Tenacity (g/denier) | Str % As-sp |
|---|---|---|---|---|---|---|---|---|
| C | 10% | 6.5% | 14.47 | 10.45 | 4.49 | 35.12 | 2.55 | 228 |
| E | 10% | 10% | 13.71 | 9.73 | 4.41 | 39.93 | 2.42 | 308 |

Adding 4.5% PTT (going from Fiber C to Fiber E) has relatively minor negative effects on the physical properties. The average reduction in the five properties is 6.5%, including a reduction in tensile strength (tenacity) of 5.1%. The improvement in dyeability for the same change, however, is a relative increase of 35%. Meanwhile, going from 100% PET to a 90% PET/10% PTT blend (i.e. from Fiber 1 to Fiber 3) shows approximately a 16% decrease in tensile strength. Prior research on PET/PTT blends shows as high as a 30% decrease in tensile strength when going from 100% PET to a 90% PET/10% PTT blend (Supahol et al.).

Further, independently adding 10% of PTT or PEN yields dye uptake increases of 87% and 24% respectively while the combination yields an unexpected 247% increase. Notably, the tenacity of the combination fiber was still suitable, whereas combining either PTT or PEN in quantities high enough to achieve a similar dye increase results in fibers that are unsuitable.

CONCLUSION

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of this disclosure. Although specific terms are employed herein, they are used in a generic and descriptive sense only and not for purposes of limitation.

LIST OF REFERENCES CITED

Supahol et al., "Thermal, Crystallization, Mechanical, and Rheological Characteristics of Poly(trimethylene terephthalate)/Poly(ethylene terephthalate) Blends", *Journal of Polymer Science: Part B: Polymer Physics,* 42:676-686 (2004)

What is claimed is:

1. A carpet comprising at least pile yarns, a primary backing and an adhesive material;
    wherein said pile yarns are tufted through said primary backing and extend outwardly from one face of said primary backing;
    wherein said adhesive material is applied at an opposite face of said primary backing with the back of the tufted pile yarns being sandwiched therein;
    wherein said pile yarns comprise fibers substantially made from a polymer blend comprising polyethylene terephthalate, polytrimethylene terephthalate and polyethylene naphthalate; said pile yarns being dyed; and
    wherein said fibers have an elongation of between 37.03% and 39.93%.

2. The carpet of claim 1, wherein said fibers are textured.

3. The carpet of claim 1, wherein said fibers have a round or trilobal shape.

4. The carpet of claim 1, wherein said fibers have a tenacity of 2.05 to 2.55 g/denier.

5. The carpet of claim 1, wherein said yarn comprises 122 or more fibers.

6. The carpet of claim 1, wherein the pile yarns exhibit increased dyeability compared to a similar pile yarn where a portion of or all of the polytrimethylene terephthalate polymer or polyethylene naphthalate polymer is replaced by polyethylene terephthalate polymer; and wherein the increase in dyeability is at least about 1%.

7. The carpet of claim 1, wherein the pile yarns exhibit an improvement in a physical characteristic selected from the group consisting of total recovery, elongation, crimp, tenacity, and shrinkage, compared to a similar pile yarn where a portion of the polyethylene naphthalate polymer is replaced by polyethylene terephthalate polymer; and wherein the improvement is at least 1%.

8. The carpet of claim 1, wherein said polymer blend comprises at least 1% by weight of polyethylene naphthalate.

9. The carpet of claim 8, wherein said polymer blend comprises at least about 68% by weight of polyethylene terephthalate.

* * * * *